United States Patent [19]

Couturier et al.

[11] Patent Number: 4,870,128
[45] Date of Patent: Sep. 26, 1989

[54] HOT MELT GASKETS

[75] Inventors: Marysusan Couturier, Framingham; Donna Trainor, West Roxbury, both of Mass.

[73] Assignee: W. R. Grace & Co.-Conn., New York, N.Y.

[21] Appl. No.: 169,652

[22] Filed: Mar. 18, 1989

[51] Int. Cl.[4] .................. C08L 31/00; C08F 20/06
[52] U.S. Cl. ............................. 524/556; 526/318.6;
524/77; 524/272; 524/488; 525/221
[58] Field of Search ................... 526/318.6, 935;
524/556, 77, 272, 488; 525/221

[56] References Cited

U.S. PATENT DOCUMENTS

| | | |
|---|---|---|
| 3,177,269 | 4/1965 | Nowak et al. |
| 3,437,718 | 4/1969 | Ross ........................ 260/889 |
| 3,520,861 | 7/1970 | Thomson et al. ............ 260/88.1 |
| 3,997,487 | 12/1976 | Rees et al. ................. 526/318.6 |
| 4,156,754 | 5/1979 | Cobbs et al. ............... 428/310 |
| 4,248,990 | 2/1981 | Pieski et al. ............... 526/318.6 |
| 4,252,924 | 2/1981 | Chatterjee ................. 526/318.6 |
| 4,253,901 | 3/1981 | Aslakson .................. 526/318.6 |
| 4,275,182 | 6/1981 | Priddy ..................... 526/318.6 |
| 4,351,931 | 9/1982 | Armitage .................. 526/318.6 |
| 4,369,287 | 1/1983 | Hutchinson et al. ......... 526/318.6 |
| 4,414,370 | 11/1983 | Hamielec et al. ........... 526/318.6 |
| 4,417,035 | 11/1983 | Oeder et al. ............... 526/318.6 |
| 4,599,392 | 7/1986 | McKinney et al. .......... 526/318.6 |
| 4,618,640 | 10/1986 | Tsuchida .................. 524/272 |
| 4,631,308 | 12/1986 | Graham .................... 524/272 |
| 4,721,761 | 1/1988 | Omae et al. ............... 526/318.6 |

FOREIGN PATENT DOCUMENTS

| | | |
|---|---|---|
| 1932891 | 2/1971 | Fed. Rep. of Germany ... 526/318.6 |
| 60-106814 | 6/1985 | Japan ...................... 526/318.6 |
| 8501052 | 3/1985 | World Int. Prop. O. ....... 526/318.6 |

Primary Examiner—Joseph L. Schofer
Assistant Examiner—N. Sarofim
Attorney, Agent, or Firm—John Dana Hubbard; William L. Baker

[57] ABSTRACT

A hot melt gasket for a closure having improved cracking and cut-through resistant properties comprising one or more copolymers of ethylene and an olefinic carboxylic acid. Preferably, a hot melt gasket comprised of one or more ethylene-acrylic acid and/or ethylene-methacrylic acid copolymers. The hot melt gasket is particularly useful in closures which are subjected to elevated temperatures and/or excessive headloads, such as warehoused products and pasteurized food stuffs.

8 Claims, No Drawings

HOT MELT GASKETS

The present invention relates to a hot melt gasket for container closures. More particularly, the present invention relates to a hot melt gasket comprising an ethylene-methacrylic acid or ethylene-acrylic acid copolymer which has superior resistance to cracking or cut-through, especially at elevated temperatures and excessive headloads.

BACKGROUND OF THE INVENTION

The use of hot melt gaskets and seals in container closures has gained wide acceptance in the past several years. These hot melts traditionally have been based upon either an ethylene vinyl acetate copolymer and/or a styrenic block copolymer.

While generally acceptable, these hot melt gaskets suffer from cracking or cut-through when the closure is applied to the container. Cracking appears as a series of small cracks in the surface of the gasket. These cracks may extend through a portion or the entirety of the gasket resulting in leakage. Cut-through is exhibited as an actual cut in a part or whole of the gasket. This too causes leakage problems. Additionally, it can cause a portion of the gasket to fall out of the closure upon removal from the container, making a complete seal impossible on reapplication of the closure to the container. The problems of cracking and cut-through are especially serious in containers which have thin flexible closures, which are subjected to excessive headloads, and/or which are subjected to elevated temperatures.

Most of these problems are encountered during the filling or processing of products such as during pasteurization or during warehouse storage where containers are stacked upon each other and subjected to long periods of elevated temperatures.

The present invention provides a solution to the problem of cracking and cut-through in hot melt gaskets.

SUMMARY AND OBJECT OF THE INVENTION

The present invention is a hot melt gasket with superior cracking and cut-through resistance, especially at elevated temperatures and excessive headloads. The hot melt gasket of the present invention comprises a copolymer of ethylene and an olefinic carboxylic acid. More particularly, the hot melt gasket of the present invention is comprised of a copolymer of ethylene and acrylic acid or methacrylic acid. Preferably, the hot melt gasket is comprised of a copolymer of ethylene and acrylic acid or methacrylic acid, a modifier resin, filler and antioxidant.

It is an object of the present invention to provide a hot melt gasket having superior cracking and cut-through resistance especially at elevated temperatures and/or excessive headload pressures.

It is a further object of the present invention to provide a hot melt gasket comprising a copolymer of ethylene and an olefinic carboxylic acid, particularly a copolymer of ethylene and acrylic acid or ethylene and methacrylic acid.

Another object of the present invention is to provide a closure with a cracking and cut-through resistant hot melt gasket.

A further object of the present invention is to provide a hot melt gasket of a copolymer of ethylene and methacrylic acid, a modifier resin, antioxidant, lubricant and filler and line the gasket into a closure.

Another object is to provide in combination a closure and a hot melt gasket wherein the hot melt gasket comprises a blend of thermoplastic copolymers selected from the group consisting of ethylene and carboxylic acid copolymers.

An object of the present invention is to provide a hot melt gasket comprising a blend of two or more copolymers of ethylene and carboxylic acid, preferably wherein a first copolymer is formed of either ethylene and acrylic acid or ethylene and methacrylic acid and a second copolymer is formed of either ethylene and acrylic acid or ethylene and methacrylic acid.

A further object of the present invention is a process comprising the steps of forming a hot melt gasket composition of a copolymer of ethylene and an olefinic carboxylic acid, a modifier resin, a lubricant, and an antioxidant, heating the hot melt until it is molten, lining the molten hot melt into an inner surface of a closure and allowing the gasket to cool.

DETAILED DESCRIPTION OF THE INVENTION

As used throughout the present specification, the term "cut-through" relates to both the phenomenon of cut-through as well as the phenomenon of cracking as described above.

Conventional wisdom in the hot melt gasket art is to decrease the melt index and therefore increase the softening point of the gasket to form a gasket which has cracking and cut-through resistant properties. Problems occur however when one attempts to decrease the melt index. As the melt index decreases, viscosity increases and the ability to line the gasket as a hot melt becomes very difficult, if not impossible.

We have unexpectedly found that one can obtain a hot melt gasket with excellent cracking and cut-through resistance without increasing the viscosity or softening point. We have discovered that the use of a copolymer of ethylene and a carboxylic acid as a hot melt gasekt provides an unexpected, superior resistance to cracking and cut-through at conventional hot melt viscosities and softening points.

Accordingly the present invention comprises a hot melt gasket having superior cracking and cut-through resistance formed of an ethylene-carboxylic acid copolymer.

Preferably, a cut-through resistant hot melt gasket for a container closure is formed of a thermoplastic blend of one or more copolymers of ethylene and an olefinic carboxylic acid and optionally a modifier resin, a lubricant and an antioxidant.

The hot melt gasket of the present invention uses as as a base polymer one or more copolymers of ethylene and a straight chain or branched olefinic carboxylic acid.

Preferably, the acid content should be from about 3% to 20% by weight. If the hot melt gasket is to be used upon containers for food stuffs, etc. for human consumption, then it is preferred that the acid content meet the limits established by the U.S. Food and Drug Administration (F.D.A.). Current limits for materials containing acrylic acid is 10% by weight, while materials containing methacrylic acid can have up to 20% by weight. Of course in non-human or non-food use, the amount of acrylic acid in the copolymer could be up to about 20% by weight.

Copolymers of the type described above are commercially available. Such commercially available copolymers include for example, ELVAX II 5610 and 5950 and Nucrel 599 (ethylene-methacrylic acid copolymers) available from E. I. DuPont de Nemours, and PRIMA-COR 2375.83 and 3460 (ethylene-acrylic acid copolymer) available from DOW. Other commercially available materials may exist and are believed to be suitable for use in the present invention.

One copolymer may be used in the present gasket or if preferred a blend of two or more of the copolymers may be used. If a blend is used, it is preferred that the copolymers contain the same carboxylic acid. For example, two copolymers of ethylene and methacrylic acid may be used in a gasket.

The amount of copolymer or copolymers used can be from about 80 parts by weight to about 120 parts by weight. Preferably, when two copolymers are used, one copolymer will be used in amounts greater than the other copolymer. For example, when one wishes to use two copolymers, one would select a first copolymer having a high melt index and low viscosity and blend in a small amount of a second copolymer with a low melt index and high viscosity until the desired viscosity is achieved. Generally, one would use from about 1 to 100 parts of the first copolymer having a high melt index and low viscosity and blend from about 1 to about 50 parts by weight of the second copolymer having a low melt index and high viscosity.

One or more modifier resins may be included in the hot melt gasket to enhance its viscosity, resiliency or tack. Generally, ester gums, especially rosin esters, such as a methyl ester of rosin may be used. Additionally various terpene based resins, such as polyalphapinene may be used. Various low molecular weight styrene resins may also be used. One such preferred resin is a poly alpha (methyl styrene). Low molecular weight polyethylenes as well as a blend of an ethylene vinyl acetate copolymer and microcrystalline wax may also be used as a modifier resin. The amount of modifier resins used in the present invention is not particularly limiting, but can be selected from a wide rane. Generally, for purposes of the present invention the range is from about 10 to 50 parts by weight, preferably from about 10 to about 30 parts by weight.

One or more lubricants may be included in the gasket in amounts from about 1 to about 5 parts by weight. Suitable lubricants include but are not limited to aliphatic hydrocarbons, such as liquid paraffin or white mineral oils; silicones such as organopolysiloxanes including polydimethylsiloxane; fatty acids, aliphatic alcohols and higher fatty acids having 8 to 22 carbon atoms, such as hydroxystearic acid and linear aliphatic monohydric alcohols; various polyglycols, such as polyethylene glycol, polypropylene glycol and polyoxypropylene-polyoxyethylene block copolymers; fatty amides such as erucylamide or octadecanamide; fatty acid esters of monohydric and polyhydric alcohols such as n-butyl stearate, glycerin fatty acid esters, polyethylene glycol fatty acid esters, and propylene glycol fatty acid esters; triglycerides and waxes such as hydrogenated edible oils and fats, linseed oil, palm oil, carnuba wax and bees wax; metal soaps such as alkali metal, alkali earth metal, zinc and aluminum salts of higher fatty acids; low molecular weight olefins such as polyethylene, polypropylene and oxidized polyethylene; fluoride resins such as polytetrafluoroethylene and polyvinyl fluoride; and other lubricants such as propylene glycol arginate, dialkyl ketones and acryl copolymers.

An antioxidant may also be included in the gasket of the present invention. The antioxidant selected should prevent thermal degradation of the gasket during formulation, application and use. Suitable antioxidants include but are not limited to hindered phenols such as a tetrakis [methylene-(3,5-di-tert-butyl-4-hydroxy hydrocinnamate)] methane, known as IRGANOX 1010 available from Ciba-Geigy: a butylated hydroxy toluene, known as BHT, available from Koppers Company, or a 1,3,5, trimethyl 2,4,6-tris[3,5-di-tert butyl-4-hydroxy benzyl] benzene, known as ETHYL 330, available from Ethyl Corporation. The amount of antioxidant may be from about 0.5 parts by weight of the gasket to about 5 parts by weight, though about 1 to about 2 parts is preferred.

Additional conventional hot melt ingredients such as plasticizers, fillers and foaming agents may be added to the hot melt gasket if desired. One such plasticizer is a diisooctylphthalate. Suitable fillers include, for example, talc, titanium dioxide and China clay.

The hot melt gasket of the present invention preferably should have a Brookfield Viscosity at 400° F. of from about 13000 cps to about 19000 cps and a softening point (Ring and Ball, C°) of at least about 100° C. The viscosity and softening point should be within a range suitable for the easy melting and application of the molten gasket to a closure.

The hot melt gasket may be compounded in any manner conventional for such hot melts.

A preferred method is to use a heated mixer (temperature of from about 350° F. to 400° F.), charge the one or more copolymers to the mixer along with the remainder of the ingredients and blend the mixture until it is smooth and homogenous. The resultant hot melt gasket material may either be used directly by supplying the molten gasket material to a heated applicator or may be formed into storable form (blocks, rods, pellets, etc.) for later use.

The hot melt gasket may be applied by any conventional method for hot melts. One method is to supply the hot melt gasket material to a heated applicator, such as a Nordson Model 12 hot melt applicator, heat the material until molten and apply the hot melt gasket to an inner surface of a closure to form the gasket.

Another method which is suitable with the present invention is to melt the material and apply it to the inner surface of a closure as a molten lump and then mold the molten lump into the desired gasket shape with a molding die.

The hot melt gasket which is formed may be foamed or unfoamed. If foamed, conventional foaming agents useful in hot melt materials may be used. Preferably, the foaming agent used is air, nitrogen, or another inert gas which is whipped, dispersed or put into solution with the molten hot melt gasket. An example of this method is disclosed in U.S. Pat. No. 4,295,573.

The present invention can be used with a wide variety of closures such as bottle caps, metal or plastic; larger container closures; pail lids and drum lids. Preferably, the present invention can be used in carbonated soft drink closures or in food packs, especially those which are pasteurized during processing such as pickles, jellies and jams, and fruit drinks. The present invention is also useful on bulk packages such as 3 or 5 gallon pails which contain food stuffs or other commodities and which are subject to stacking at elevated temperatures such as occurs in warehouses.

It is noted that the hot melt gasket of the present invention exhibits excellent adhesion properties to metal closures. It is believed that the presence of the acid groups creates this adhesion property.

EXAMPLE 1

To a heated mixer at 350°–400° F. was charged 100 parts of an ethylene-methacrylic acid copolymer having a 9% methacrylic acid content and a melt index of 500 (ELVAX II 5610, by E. I. Dupont de Nemours), 10 parts of a second ethylene-methacrylic acid copolymer having a 13% methacrylic acid content and a melt index of 25 (ELVAX II 5950, by E. I. DuPont de Nemours), 20 parts of a modifier resin (KRISTALEX 1120 by Hercules, Inc., a poly(alpha methylsytrene)resin), and 1 part of an antioxidant (IRGANOX 1010 by Ciba Geigy). When the mixture was smooth and homogenous, 2 pats each of a first lubricant (Dow Corning 200 Fluid from Dow Corning), second lubricant (Adogen 58 from Sherex Chemical) and a wax (Armid O Flake, from AKZO Chemie) were added. The finished composition was heated to a temperature of from about 375° to 425° F. in a Nordson Model 12 hot melt applicator. The hot melt composition was lined through the applicator to the interior sealing area of 28 mm continuous thread polyethylene caps at a film weight of 275 mg. The caps were aged for 48 hours at room temperature to allow the lubricant to bloom to the surface of the gasket. The caps were applied to 16 ounce PET bottles of carbonated water at an application torque of from 16–19 inch-pounds. After 24 hours, the actual volume of $CO_2$ in half of the bottles was measured. To simulate warehouse conditions, the remainder of the bottles were tested by loading 100 pounds to the top of each cap using a precalibrated spring device and storing them at 100° F. for one week. The load was then released and the bottles were stored at room temperature for 24 hours. The gas volumes of each bottle were then measured. The caps were removed from the bottles and the depth of impression of the bottle finish into the gasket was measured.

The results were as follows:

| | |
|---|---|
| Initial Gas volume | 3.49 |
| Final Gas volume after stacking | 3.13 |
| Gasket impression after stacking | all medium light impressions no cracking or cut-through was observed. |

EXAMPLE II

As a comparison, a typical EVA based hot melt gasket was formulated as follows: To a heated mixer was charged 90 parts of an ethylen-vinyl acetate copolymer having 18% vinyl acetate content and a melt index of 530, 10 parts of a second EVA copolymer having a 28% vinyl acetate content and a melt index of 950, 20 parts of a linear low density polyethylene, having a melt index of 40, 10 parts of a styrene-butadiene copolymer, 2 parts each of the lubricants and wax of Example I and 1 part of the antioxidant of Example I.

The composition was applied and tested as in Example I. The results were as follows:

| | |
|---|---|
| Initial Gas Volume | 3.38 |
| Final Gas Volume after stacking | 3.20 |
| Gasket Impression after stacking | ½ of gaskets were cut-through completely; remainder had very deep impressions. |

EXAMPLE III

A commercial hot melt gasketing material comprising a blend of an ethylene vinyl acetate copolymer, wax, and plasticizer, offered by W. R. Grace & Co. as DARAMELT® 108 hot melt was applied through an applicator to the interior of 28 mm continuous thread polyethylene caps at a film weight of 275 mg. The caps were applied to 16 ounce PET bottles of a carbonated beverage, one half of the samples were stored at room temperature for twenty four hours with no load on top of the caps and wherein gas volume was measured. The other half were stored for one week at room temperature with 100 pounds on top of the caps as described in EXAMPLE I. The gas volume of each bottle was then measured. The caps were removed and the depth of impression of the bottle finish into the gasket was measured.

The stack test was performed at room temperature rather 100° F. Tests at 100° F. were not attempted in view of the failure of the gaskets at room temperature.

The results were as follows:

| | |
|---|---|
| Initial Gas Volume | 3.4 |
| Final Gas Volume after stacking | 3.5 |
| Gasket Impression | all gaskets exhibited cracking, some material fell out upon removal |

EXAMPLE IV

A composition similar to that of Example I was formulated with the following changes, the deletion of the 10 parts of a second ethylene-methacrylic acid copolymer and the substitution of a different tackifier resin (KRISTALEX 5140 by Hercules, Inc.). The hot melt gasket material was applied into an interior sealing area of a 70 mm diameter polypropylene cap at a film weight of 700 to 750 mg per cap. The gasketed caps were stored at room temperature for 24 hours to allow the lubricant to bloom to the surface of the gasket. The caps were tested as follows:

Glass jars having a G-70 finish were filled with 180° F. water with a 10% head space. The jars were closed with the gasketed caps at an application torque of 30 inch-pounds. The filled and closed jars were then processed in a 200° F. water bath for 20 minutes. The jars were then stored at room temperature for 24 hours. At that time the vacuum level in the jars was measured by piercing the cap with a probe mounted to a vacuum gauge. The amount of torque required to remove the cap was measured with an Owens-Illinois torque tester. The gaskets were then visually examined for depth of impression and appearance with the following results:

| | |
|---|---|
| Vacuum, inches Hg | 10.3 |
| Removel torque, inch-pounds | 54.5 |
| Gasket Appearance | light to medium impression no cracking or cut-through was observed |

EXAMPLE V

A gasket composition similar to that of Example II was formulated as described in Example II with the following additions: two additional parts each of the lubricant and slip agent of Example I.

The gasket composition was lined and tested as described as in Example III with the following results:

| | |
|---|---|
| Vacuum, inches Hg | 19.7 |
| Removal torque, inch-pounds | 22.3 |
| Gasket Appearance | Cut-through on all samples |

EXAMPLE VI

To a heated mixer was charged 75 parts of an ethylene-acrylic acid copolymer having an 8% acrylic acid content and 2600 melt index (PRIMACOR 2375.83 by Dow), 25 parts of an ethylene-acrylic acid copolymer having a 9% acrylic acid content and a melt index of 20 (PRIMACOR 3640 by Dow) 20 parts of a modifier resin (KRISTALEX 5140 by Hercules), 2 parts each of the lubricants and wax of Example I and 1 part of the antioxidant of EXAMPLE I.

The gasket composition was mixed, lined, and tested as described in EXAMPLE III with the following results:

| | |
|---|---|
| Vacuum, inches Hg | 13.4 |
| Removel Torque, inch-pounds | 86.0 |
| Gasket Impression | light to medium impression no cracking or cut-through was observed |

The results of the tests conducted on the gaskets of EXAMPLES I–IV are contained in the TABLE, along with the Brookfield Viscosity and softening point for each EXAMPLE.

As can be seen from the TABLE, the hot melt gaskets of the present invention showed superior cut-through resistance as compared to the conventioal EVA based hot melts, both in carbonated beverages which were stacked at elevated temperatures and in food packs which undergo pasturization. This superior resistance would not have been expected especially in view of the similar viscosity and softening point of the hot melts tested. One would have expected to have found similar cracking or cut-through characteristics in all of the hot melts tested.

While this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

| | EXAMPLE I | EXAMPLE II | EXAMPLE III | EXAMPLE IV | EXAMPLE V | EXAMPLE VI |
|---|---|---|---|---|---|---|
| Brookfield Viscosity at 400° F. cps | 15,325 | 18,983 | 17,525 | 13,275 | 17,900 | 14,000 |
| Softening Point - Ring and Ball, °C. (ASTM E28) | 104.5 +/− .5 | 103.0 +/− .5 | 89.5 +/− .5 | 103.5 +/− .5 | 98.00 +/− .5 | 103.5 +/− .5 |
| Gasket End Use | Beverage | Beverage | Beverage | Food | Food | Food |
| Beverage Test Results | | | | | | |
| Film weight, mg | 275 | 275 | 275 | | | |
| Stack Test, 100 lb., 100° F. 1 week | | | | | | |
| Initial Gas Volume | 3.49 | 3.38 | 3.4* | | | |
| Final Gas Volume after Stacking | 3.13 | 3.20 | 3.5* | | | |
| Gasket Impression | Med. light no cut-through | Very deep | all gaskets were cracked, some material fell out upon removal Cut-through 33%, 66% with deep impressions | | | |
| Food Test Results | | | | 725 | 725 | 725 |
| Film weight, mg | | | | | | |
| Pasteurization Test | | | | | | |
| Vacuum, in Hg | | | | 10.3 | 19.7 | 13.4 |
| Removal Torque, in.-lbs | | | | 54.5 | 22.3 | 86.0 |
| Gasket Impression | | | | Light-medium no cracking or cut-through | Cut-through on all samples | Light-medium no cracking or cut-through |

*Stack test was at room temperature, an elevated temperature stack test was not attempted in view of the failure of the gaskets at room temperature.

What we claim:

1. A hot melt gasket with cut-through resistant properties comprising a copolymer of ethylene and an olefinic carboxylic acid, the copolymer being selected from the group consisting of ethylene-acrylic acid copolymers, ethylene-methacrylic acid copolymers and mixtures thereof; one or more modifier resins, a lubricant and an antioxidant.

2. The hot melt gasket with cut-through resistant properties of claim 1 wherein the modifier resin is a poly (alpha methylstyrene) resin; the lubricant is a polydimethylsiloxane; and the antioxidant is a tetrakis*methylene*(3,5-di-tert-butyl-4-hydroxy hydrocinnamate)] methane.

3. A container closure and hot melt gasket having improved cut-through resistance comprising a hot melt gasket of one or more copolymers of ethylene and an olefinic carboxylic acid, a tackifier resin, one or more lubricants and an antioxidant.

4. The container closure and hot melt gasket of claim 3 wherein the closure is selected from the group of metal and plastic closures; and the one or more copolymers of ethylene and olefinic carboxylic acid is selected from the group consisting of ethylene-acrylic acid copolymers and ethylene-methacrylic acid copolymers and mixtures thereof.

5. A hot melt gasket having cut-through resistant properties comprising from about 75 to about 100 parts by weight of an ethylene-acrylic acid copolymer; from about 5 to about 20 parts by weight of a modifier resin; from about 1 to about 4 parts by weight of a lubricant and from about 1 to about 4 parts by weight of an antioxidant.

6. A hot melt gasket comprising a blend of a copolymer of ethylene and an olefinic carboxylic acid, a modifier resin, a lubricant and an antioxidant, wherein the gasket has cut-through resistance.

7. The hot melt gasket of claim 6 wherein the copolymer is selected from the group consisting of ethylene-acrylic acid copolymers, ethylene-methacrylic acid copolymers, and mixtures thereof.

8. The hot melt gasket of claim 6 wherein the cut-through resistance of the gasket is such that a gasket having a film weight of 275 milligrams, lined into a 28 mm plastic closure, closed on a PET container and subjected to one week of temperatures of 100° F. and a head load of 100 pounds on each cap, followed by 24 hours at room temperature and not head load, experienced no cut-through.

* * * * *